United States Patent [19]

Bascom et al.

[11] 4,058,423
[45] Nov. 15, 1977

[54] CARPET REPAIR DISK AND TOOL

[76] Inventors: Hollis H. Bascom, 1247 DePaul Way; John J. Greci, 1442 Third St., both of Livermore, Calif. 94550; Merle R. Hoopengardner, 879 Mountain View Drive, Lafayette, Calif. 94549

[21] Appl. No.: 705,911

[22] Filed: July 16, 1976

[51] Int. Cl.² .............................................. B32B 35/00
[52] U.S. Cl. ........................................ 156/98; 30/124; 30/152; 156/263; 264/36; 427/140; 428/63
[58] Field of Search .................... 156/98, 263; 428/63; 30/124, 151, 152; 427/140; 264/36

[56] References Cited

U.S. PATENT DOCUMENTS

| 1,113,030 | 10/1914 | McLaurin | 428/63 |
|---|---|---|---|
| 1,947,152 | 2/1934 | Clark | 428/63 |
| 3,138,505 | 6/1964 | Hirsch | 428/63 |
| 3,456,346 | 7/1969 | Snyder | 30/151 |
| 3,558,385 | 1/1971 | Ronning | 156/98 |
| 3,697,358 | 10/1972 | Ronning | 156/94 |
| 3,786,564 | 1/1974 | Acheson | 30/124 |

Primary Examiner—Edward G. Whitby
Attorney, Agent, or Firm—Owen, Wickersham & Erickson

[57] ABSTRACT

A manually operated carpet repair tool cuts a circular plug in a carpet to remove a damaged area. The carpet repair tool has two cutting blades which are equally spaced circumferentially on the lower periphery of the tool for balanced tracking of the blades in the cut.

Circumferential grooves on a centering pin grip the carpet plug as the cut is being made so that the operator can test to see if the plug is free during the cutting operation and still continue the cut in exactly the same location as before if the cut has not been completed.

A carpet repair disk is positioned beneath the opening cut in the carpet to retain a matching carpet repair patch in the opening cut by the carpet repair tool. The carpet repair disk includes a strand reinforced paper backing with an adhesive on the upper surface.

The carpet repair disk is of larger diameter than the diameter of the opening cut in the carpet. The disk has a slit extending inwardly from the periphery into the center of the disk to form two flaps so that a larger size disk can be easily inserted in the smaller size opening by first placing one flap partially through the opening and into the carpet and then rotating the rest of the disk through the opening and into the backup position under the opening in the carpet.

The adhesive on the upper surface of the disk engages the back side of the carpet entirely around the opening and also engages the back side of the patch to hold the patch into place.

10 Claims, 11 Drawing Figures

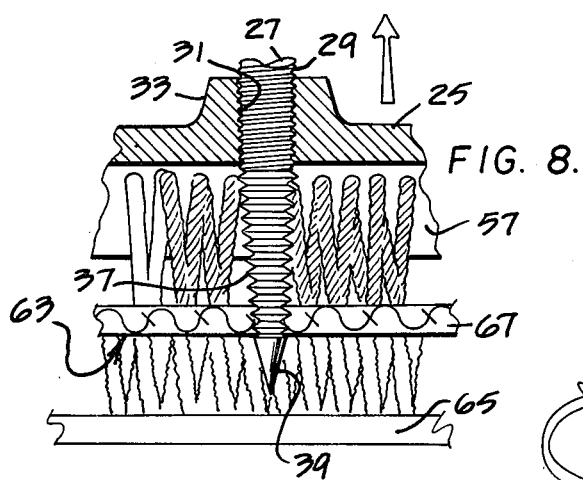
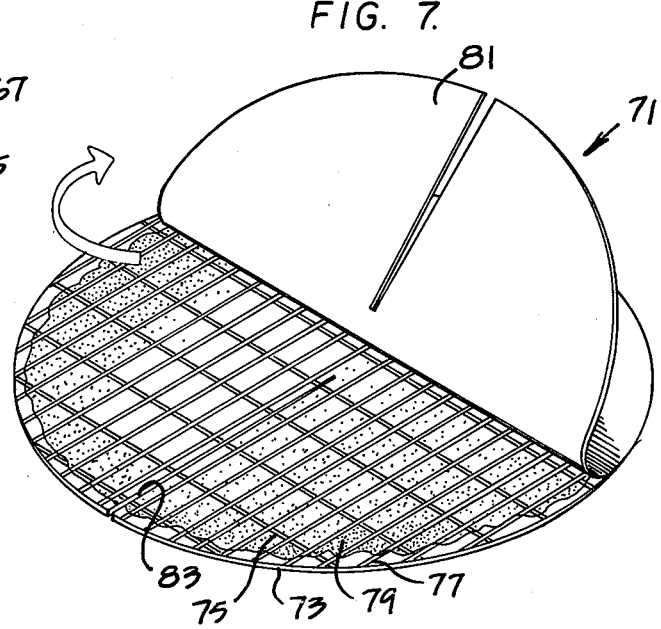
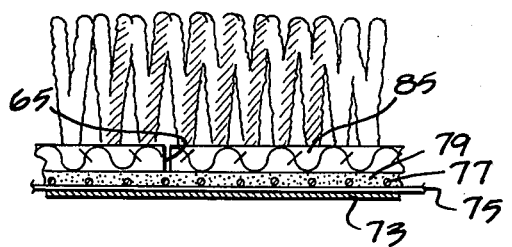
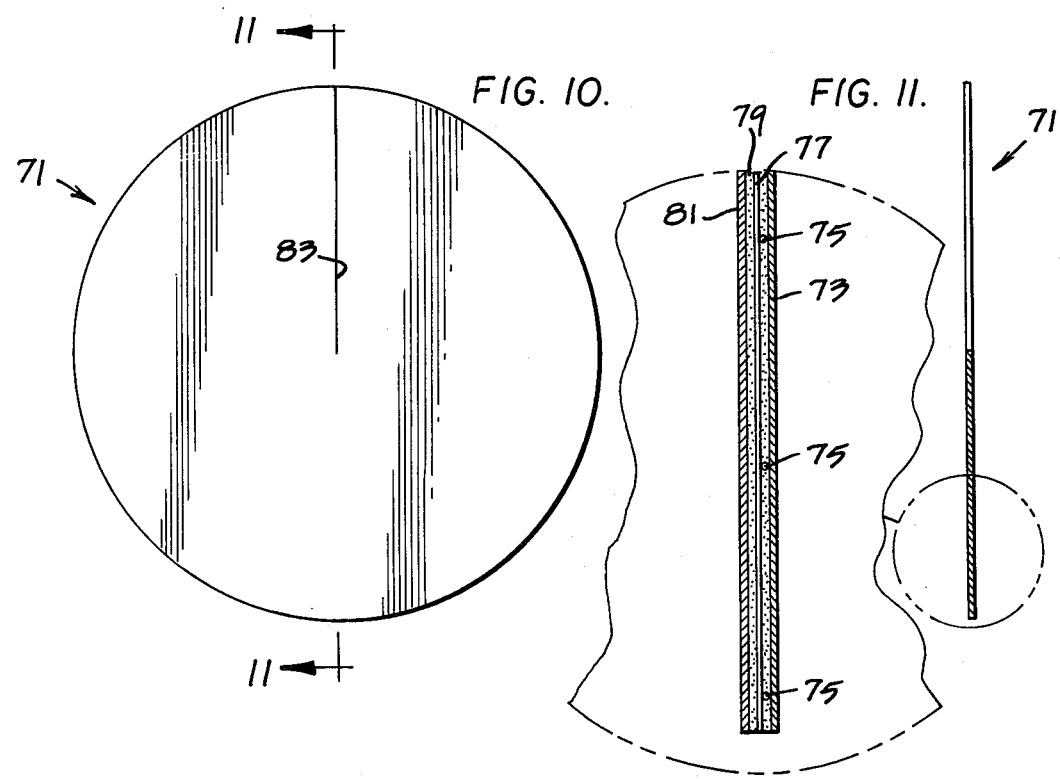

CARPET REPAIR DISK AND TOOL

BACKGROUND OF THE INVENTION

This invention relates to methods and apparatus for making carpet repairs.

It relates particularly to a carpet repair tool and to a carpet repair disk and to related methods of using the carpet repair tool and the carpet repair disk.

Small sections of the carpet are often damaged by burns, tears and the like. Since the damaged areas of carpets are usually confined to relatively small cross-sectional areas, it is often feasible to cut out the damaged area and to make a patch with a replacement plug that is cut to fit the cut out opening.

In order to retain a satisfactory appearance of the carpet, the damaged area must be cut out with precision, and a precisely matched patching plug must be fitted within the opening cut out in the original carpet. A need therefore exists for a tool device which can be used by unskilled people to make a precision cut out.

Current methods for making carpet repairs require skilled and trained people to do a satisfactory repair job, and the cost to the public is therefore high. While a number of self-contained cutters are on the market, these prior art cutters have been found to be awkward and have not been readily adapted to precision cutting, particularly if the cutters are removed from position before the cut is finished.

For example, one cutter which is presently commercially available employs a 360° scalloped cutting edge and is heavy and awkward to use. Another prior art cutter is a lightweight hollow plastic cutter (of the general kind illustrated in U.S. Pat. No. 3,456,346 to Snyder) and has a single razor-type blade which extends downward through a flat bottom surface of the cutter at a location which is offset inwardly from the outer circular side of the cutter.

SUMMARY OF THE INVENTION

It is a primary object of the present invention to overcome the problems presented by the prior art cutters.

The carpet repair tool of the present invention is a lightweight tool which embodies features that make it easy to operate by hand, but it is constructed of a metal casting which gives the tool the necessary rigidity to prevent distorting during use and loss of tracking to thereby insure a precisely cut carpet plug.

The carpet repair tool of the present invention comprises a cylindrically-shaped housing having a hollow interior except for a central web which forms a support for a center screw that forms the pivot point.

The screw is sturdy enough so that it does not distort during use and thus helps to produce a precision cut carpet plug.

The screw has circumferential grooves on a lower part of the screw, just above a tapered tip; and these circumferential grooves serve to grip the carpet plug as the cut is being made so that the operator can test to see if the plug is free by pausing during the cutting operation and tugging gently upward on the tool. If the plug has been cut free, the plug will come up with the tool because the plug has been wedged on the circumferential groove part of the screw. If the plug has not been cut free, the tool can be pushed down and a cut can be continued in exactly the same location as before, since the pivot point was not disengaged.

The carpet repair tool of the present invention has two or more blades which are equally spaced circumferentially at the lower circular periphery of the cutter. The balanced spacing of the cutting blades serves to balance the tracking of the blade in the cut, and this insures a precision cutting of the plug and enables a faster cut to be made than can be made with a single blade.

The carpet repair tool of the present invention has a hand grip on the outside of the top end of the carpet repair tool, and the hand grip is of larger diameter than the diameter of the circle the blades are cutting to increase the mechanical advantage of the hand applied cutting torque.

The bottom of the tool has a hollow interior for receiving the cut out plug within the bottom end of the carpet repair tool.

The present invention also comprises a carpet repair disk which is used in association with the carpet repair tool for holding a replacement patch in place in the opening cut by the carpet repair tool.

The carpet repair disk is a circular disk, of larger diameter than the opening cut by the carpet repair tool so that the adhesive on the disk engages the backing of the carpet around the entire periphery of the opening cut by the carpet repair tool, and the carpet repair disk is used in place of the two short lengths of a dry-type seaming tape that have been used in the prior art. In the prior art the two short lengths of the dry-type seaming tape were placed under the area being repaired, and a latex or hot melt adhesive was applied by hand. This method was very awkward and time consuming.

The carpet repair disk of the present invention comprises a paper backing which is reinforced by bi-directional strands, such as fibreglas and rayon.

In a preferred embodiment of the present invention the strand reinforcement is a nonwoven fabric which is formed integral with the paper backing.

The strand reinforced side of the disk is coated with a pressure-sensitive adhesive, and this adhesive is protected by a silicone treated release paper that is peeled off prior to use.

The feature of the repair disk that makes it feasible to install a larger diameter disk within a smaller diameter opening cut in the carpet is a slit which extends half way across the diameter of the disk from the outer periphery toward the center of the disk. This slit forms two flaps which can be swung vertically with respect to one another. The disk can therefore be installed through the smaller size carpet opening by first placing one flap partially through the opening and under the carpet and then rotating the rest of the disk through the opening and into the backup position under the opening in the carpet.

In most cases it is preferable to moisten the pressure-sensitive adhesive with water before inserting the disk in place to prevent premature adhesion.

After the disk has been installed in place beneath the opening, the replacement plug is pressed down into place within the opening and on top of the carpet repair disk and is retained securely in position by the carpet repair disk.

Carpet repair apparatus and methods which incorporate the structure and techniques described above and which are effective to function as described above constitute specific objects of this invention.

Other and further objects of the present invention will be apparent from the following description and claims and are illustrated in accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made if desired by those skilled in the art without departing from the present invention and the purview of the appendant claims.

BRIEF DESCRIPTION OF THE DRAWINGS

FIG. 7 is an isometric view of a carpet repair disk used for holding the patch plug in place in the opening cut in the carpet by the carpet repair tool. A protective release sheet has been shown partially peeled back off the upper surface of the pressure-sensitive adhesive coating on the upper surface of the disk;

FIG. 8 is a fragmentary side elevation view in cross-section showing how the circumferential ridges on the centering pin of the carpet repair tool retain the cut out plug in place on the centering pin as the carpet repair tool is lifted upward after the damaged plug has been cut out of the carpet;

FIG. 9 is a fragmentary side elevation view in cross-section showing how the carpet repair disk engages the back surface of the carpet around the periphery of the opening and also engages the back surface of the patch plug to hold the plug in place;

FIG. 10 is a top plan view of the carpet repair disk shown in FIG. 7; and

FIG. 11 is an elevation view in cross-section taken along the line and in the direction indicated by the arrows 11—11 in FIG. 10. The part of the disk encircled in FIG. 11 has been shown considerably enlarged in the related balloon.

DESCRIPTION OF THE PREFERRED EMBODIMENTS

Figure 1:
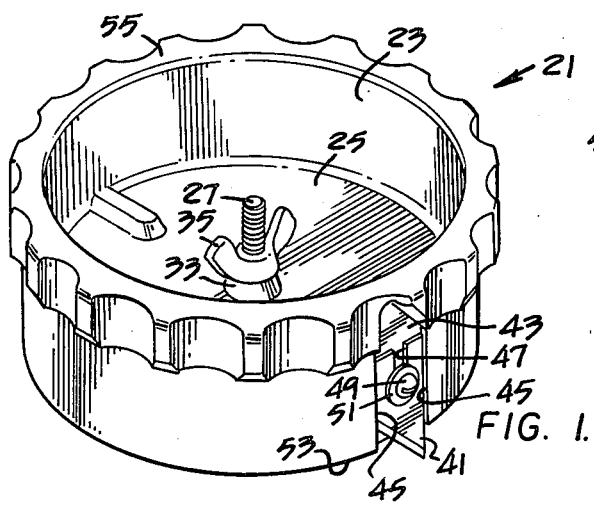
FIG. 1 is an isometric view of a carpet repair tool constructed in accordance with one embodiment of the present invention.

A carpet repair tool constructed in accordance with one embodiment of the present invention is indicated generally by reference numeral 21 in FIGS. 1-4.

Figure 2:
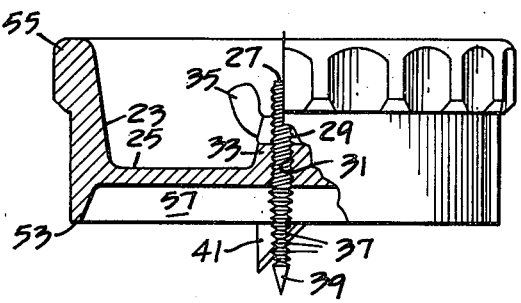
FIG. 2 is a side elevation view of the carpet repair tool shown in FIG. 1 with part of the tool broken away and in section to show details of the central web and vertical adjustment for the centering pin.

As best illustrated in FIGS. 1 and 2, the carpet repair tool 21 comprises a one-piece metal die-casting having a generally cylindrically shaped side portion 23 and a central web 25.

The web 25 extends across the interior of the carpet repair tool 21 to provide a support for a centering pin 27.

The upper part of the centering pin 27 has screw threads 29 which permit the vertical position of the centering pin 27 to be adjusted by turning the threads 29 within related threads 31 in a boss 33 in the middle of the web 25.

A nut 35 locks the centering pin 27 in an adjusted position.

The lower part of the centering pin 29 has a series of circumferential grooves 37 extending around the pin above a tapered point portion 39 and below the screw threads 29. These circumferential grooves engage the carpet backing (as will be described in greater detail with reference to FIG. 4 and FIG. 8) to hold the plug that is being cut out in place on the centering pin as the carpet repair tool 21 is lifted upward from the carpet.

The carpet repair tool 21 has two or more cutting blades which are equally spaced circumferentially at the periphery of the cutter to provide balanced tracking of the blades in the cut. This insures a precision plug and makes a faster cut than can be made with one blade.

Figure 3:
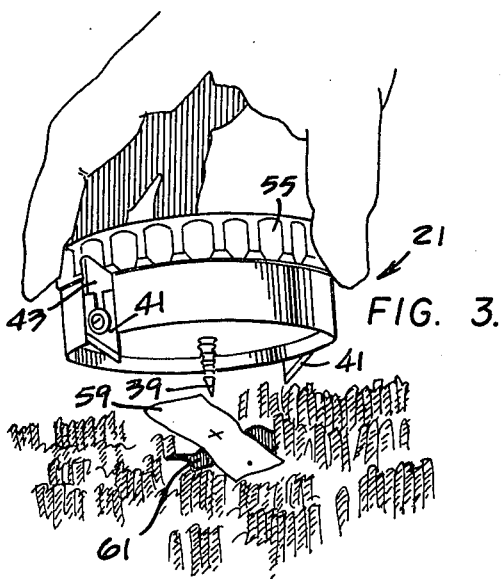
FIG. 3 is a pictorial view showing the carpet repair tool ready for use.

In the specific embodiment of the invention shown in the drawings, the carpet repair tool 21 has two cutter blades 41 (see FIG. 3).

As best illustrated in FIG. 1 the outer surface of the metal die-casting 23 is formed with a blade receiving slot 43 for receiving a respective blade 41. The slot 43 provides side edges 45 which engage the respective side edges of the blade 41 as illustrated.

Each blade 41 has a slot 47 in its upper end, and a screw 49 and a washer 51 fit within and over the slot 47, as illustrated in FIG. 1, to provide for vertical adjustment of the cutting edge of the blade 41 with respect to the lower edge 53 of the carpet repair tool 21.

The slots 43 also are shaped to permit the blade 41 to be reversed from the position shown in FIG. 1 and to be retained upside down in the slot (with the cutting edge covered by the upper triangular shaped portion of the slot 43) for safety in shipping and in storage of the carpet repair tool after use.

Likewise, the locking nut 35 and threaded engagement of the centering pin 27 in the boss 33 of the central web 25 permit the centering pin 27 to be removed from the operative position as shown in FIG. 2 and to be taped or otherwise retained with the carpet repair tool 21 for safety in shipping and also for storage of the tool after a cutting operation has been completed.

The carpet repair tool 21 includes an outside handle, in the form of a knurled ring 55 for applying hand torque to the carpet repair tool 21 at a diameter larger than the diameter of the circle the blades 41 are cutting in. This makes it easier to turn the carpet repair tool 21 than would be the case if the torque were applied inside the cutting circle.

As best illustrated in FIG. 2 the lower part of the carpet repair tool 21 provides a hollow opening 57 above the lower peripheral edge 53, and this opening 57 co-acts with the circumferential grooves 37 on the centering pin 27 to permit the plug of carpet being cut to be pulled up and into the interior of the carpet repair tool in the course of the cutting operation and to be retained there when the cut-out plug is removed. See FIG. 4 and FIG. 8.

Figure 4:
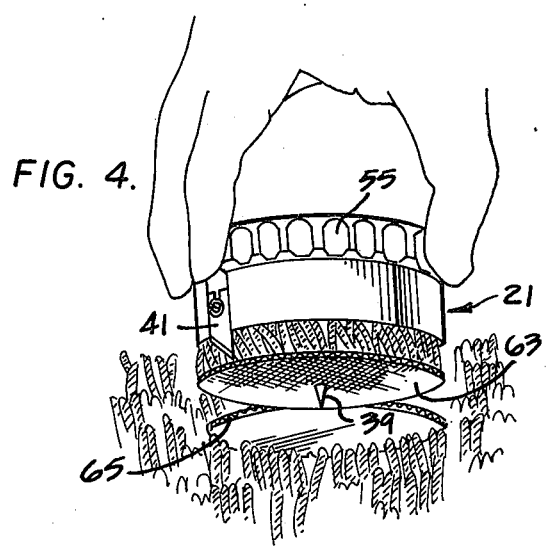
FIG. 4 is a pictorial view showing the damaged area being removed.
Figure 5:
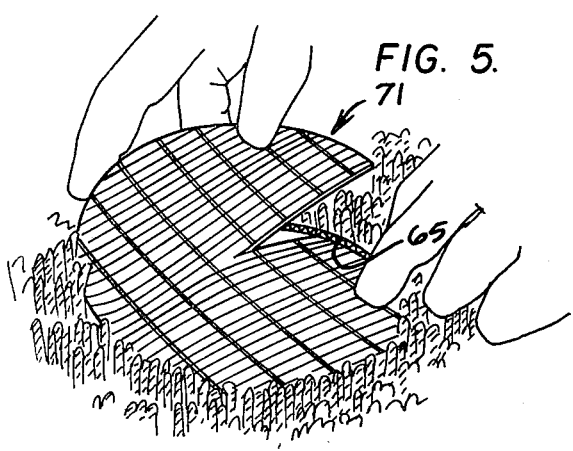
FIG. 5 is a pictorial view showing an adhesive coated carpet repair disk being inserted into the opening as cut by the carpet repair tool.

The operation of the carpet repair tool 21 in cutting a flawed piece from a carpet is best illustrated in FIGS. 3, 4 and 8.

As illustrated in FIG. 3, the cutting operation starts with placing a piece of tape 59 over the center of the burned or otherwise flawed area 61 of the carpet to be repaired. This piece of tape provides a visual aid for centering the tapered end 39 of the centering pin in the damaged area.

The carpet repair tool 21 is then pressed down and rotated to cut out a circular plug 63 containing the damaged area (see FIG. 4) and to form a circular opening 65 in the carpet to be repaired.

As best illustrated in FIG. 8, the tapered end 39 of the centering pin 27 presses down through the backing 67 of the plug being cut out, and the circumferential grooves 37 then lock into the backing 67.

As a result, the operator can test to see if the plug is free by pausing during the cutting operation and tugging gently upward on the tool. If the plug has been cut free, the plug will come up with the tool because the plug has been wedged over the pivot point 39 and onto the grooves 37. If the plug has not been cut free, the carpet repair tool 21 can then be pushed down and a cut can be continued in exactly the same location as before since the pivot point was not disengaged.

The carpet repair tool 21 is used in the same way to cut a matching repair plug from another section of the carpet, and this repair plug is inserted and retained within the opening 65 by means of a carpet repair disk 71 shown in FIGS. 5, 7 and 9-11.

The carpet repair disk 71 is of larger diameter than the diameter of the opening 65 cut in the carpet so that when the carpet repair disk is inserted through the opening 65 and beneath the carpet, it will engage the carpet backing around the entire periphery of the opening 65 (by means of an adhesive upper surface to be described) to provide a secure attachment to the carpet backing.

As best illustrated in FIGS. 9 and 11, the carpet repair disk comprises a paper backing 73.

Strand reinforcement in the form of bi-directional warp strands 75 and cross strands 77 are adhered to the upper surface of the paper backing 73, and in a preferred embodiment of the present invention the strand reinforcement 75, 77 is a nonwoven fabric which is formed integrally with the paper backing 73. This nonwoven fabric strand reinforced sheet provides a quite low profile as illustrated.

The upper surface of the disk 71 is coated with a pressure-sensitive adhesive 79, and this pressure-sensitive adhesive is protected by a silicone-treated release paper 81 that is peeled off prior to use.

An example of a suitable pressure-sensitive adhesive is adhesive No. 4008 by National Starch and Chemical Corporation, and an example of a suitable polyvinyl acetate adhesive for attaching the yarns to the paper is the Fuller Company product No. 9331-7.

It is a very important feature of the present invention that the repair disk 71 has a slit 83 which extends inward from the outer periphery to the center of the disk as best illustrated in FIG. 7. This slit forms two flaps which can be swung vertically with respect to one another and enables the user to pivot the larger diameter disk 71 through a smaller diameter opening 65 (see FIG. 5). This is, to install the disk 71 in position beneath the opening 65, the user first places one flap partially through the opening and under the carpet and then rotates the rest of the disk through the opening and into backup position under the opening and the carpet.

In most cases it is preferable to moisten the upper surface of the pressure-sensitive adhesive 79 with water before inserting the disk in place to prevent premature adhesion.

Figure 6:
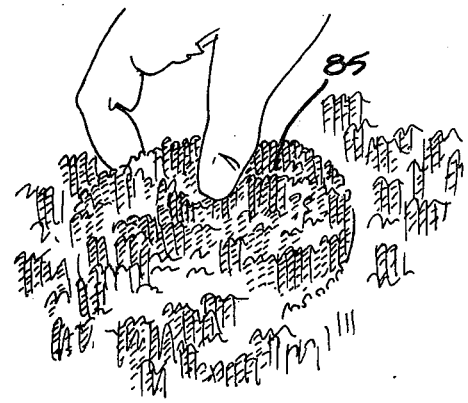
FIG. 6 is a pictorial view showing a matching patch being pressed into place in the opening and into the adhesive coated upper surface of the carpet repair disk.

After the repair disk 71 has been installed in place, the patching plug 85 is then pressed down into place within the opening 65 and on top of the adhesive upper surface of the carpet repair disk 71 as illustrated in FIG. 6.

The patching plug is then held securely in place by the carpet repair disk.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A method of repairing a damaged area of a carpet and comprising, cutting a circular plug which contains the damaged area, removing the plug to leave a circular opening in the carpet, cutting a matching patch plug from another portion of carpet, inserting a unitary carpet repair disk through the opening and into backup position under the opening and the carpet, said disk having a larger diameter than the diameter of the opening cut in the carpet so that the outer periphery of the repair disk engages the back side of the carpet entirely around the opening, installing the patch plug in the opening, adhering the patch plug and the repair disk to retain the patch plug in place, and wherein the carpet repair disk comprises a barrier sheet, having a nonwoven fabric strand reinforcement adhered to one surface of the sheet and a pressure sensitive adhesive on said one surface for adhering the strand reinforcement to the back surface of the patch plug and the carpet around the patch opening to hold the patch plug in place and wherein the carpet repair disk includes a silicone treated release paper on the pressure sensitive adhesive and including the step of peeling off the silicone treated release paper prior to inserting the carpet repair disk through said opening cut in the carpet.

2. The invention defined in claim 1 including the step of moistening the outer upper surface of the pressure sensitive adhesive with water before inserting the disk in place to prevent premature adhesion.

3. A method of repairing a damaged area of carpet and comprising, cutting a circular plug which contains the damaged area, removing the plug to leave a circular opening in the carpet, cutting a matching patch plug from another portion of carpet, inserting a unitary carpet repair disk through the opening and into backup position under the opening and the carpet, said disk having a larger diameter than the diameter of the opening cut in the carpet so that the outer periphery of the repair disk engages the back side of the carpet entirely around the opening, installing the patch plug in the opening, adhering the patch plug and the repair disk to retain the patch plug in place, and wherein the carpet repair disk has a single slit extending inward from the periphery toward and near to the center to form two flaps and wherein the step of inserting the carpet repair disk through the smaller opening includes first placing one flap partially through the opening and under the carpet and then rotating the rest of the disk through the opening and into backup position under the opening and carpet.

4. A carpet repair disk for retaining a carpet repair patch in a matching pre-cut patch opening in a carpet, said carpet repair disk comprising, a unitary barrier sheet which is enough larger than the opening so as to engage the back side of the carpet entirely around the opening, strand reinforcement means attached to one surface of the sheet, adhesive means on said one surface for adhering the strand reinforcement means and the barrier sheet to the back surface of the carpet around the patch opening to thereby hold the patch in place, and wherein the carpet repair disk has a single slit extending inwardly from the periphery toward and near to the center of the disk and forming two flaps so that a larger size disk can be readily inserted in a smaller size opening by first placing one flap partially through the opening and under the carpet and then rotating the rest of the disk through the opening and into back up position under the opening and carpet, and wherein the strand reinforcement means include a non-woven fabric integrally attached to the barrier sheet by an adhesive which is separate from said adhesive means.

5. A carpet repair disk for retaining a carpet repair patch in a matching pre-cut patch opening in a carpet, said carpet repair disk comprising, a unitary barrier sheet which is enough larger than the opening so as to engage the back side of the carpet entirely around the opening, strand reinforcement means attached to one surface of the sheet, adhesive means on said one surface for adhering the strand reinforcement means and the barrier sheet to the back surface of the carpet around the patch opening to thereby hold the patch in place, and wherein the carpet repair disk has a single slit extending inwardly from the periphery toward and near to the center of the disk and formng two flaps so that a larger size disk can be readily inserted in a smaller size opening by first placing one flap partially through the opening and under the carpet and then rotating the rest of the disk through the opening and into back up position under the opening and carpet, and wherein said adhesive means comprise a pressure sensitive adhesive.

6. The invention defined in claim 5 including a protective release paper sheet releasibly attached to the upper surface of the adhesive means.

7. The invention defined in claim 6 wherein the protective release paper sheet is a silicone treated release paper that is peeled off prior to use.

8. The invention defined in claim 5 wherein the pressure sensitive adhesive is a composition which can be moistened with water to prevent premature adhesion to the carpet back while inserting the carpet repair disk through said patch opening.

9. A carpet repair tool for cutting and removing from a carpet a circular plug which contains a damaged area of the carpet and for cutting a matching patching plug from another portion of carpet, said carpet repair tool comprising, a housing having a circular cylindrical shape, cutting blades equally spaced circumferentially on the lower periphery of the housing, a centering pin including a point extending downwardly below the housing at the center of the housing, and a hand grip on the housing for rotating the housing to cut a circular plug from the carpet, and wherein the centering pin includes circumferential grooves for gripping the carpet plug as the cut is being made so that the operator can test to see if the plug is free by pausing during the cutting operation and tugging gently upward on the tool with the plug being cut retained on the centering pin and whereby the tool can be pushed down and the cut continued in exactly the same location as before if the cut has not been complete since the pivot point was not disengaged.

10. The invention defined in claim 9 wherein the hand grip is of larger diameter than the diameter of the circle the blades are cutting for increasing the mechanical advantage of the hand applied cutting torque and comprises a knurled outer ring on the upper part of the cylindrical housing.

* * * * *